Dec. 27, 1927.

A. W. RYBECK

SHAFT COUPLING

Filed April 25, 1924

1,653,930

Inventor,
Adolph W. Rybeck
By Ira M. Jones.
Attorneys

Patented Dec. 27, 1927.

1,653,930

UNITED STATES PATENT OFFICE.

ADOLPH W. RYBECK, OF MILWAUKEE, WISCONSIN.

SHAFT COUPLING.

Application filed April 25, 1924. Serial No. 708,919.

This invention relates to certain new and useful improvements in shaft couplings and refers more particularly to a device for flexibly connecting shafts so as to accommodate any disalignment that may exist therebetween.

Varous types of flexible couplings have been designed to so drivingly connect two shafts as to accommodate any offset, end play, or angular alignment therebetween, and it is a general object of this invention to provide a shaft coupling which is extremely simple of construction, capable of standing great stresses and which will so connect shafts arranged end to end as to accommodate any disalignment that may exist without producing undue vibration.

It is another object of this invention to provide a flexible shaft coupling having means for resiliently connecting the shafts which becomes inoperative upon the stress on the shafts increasing beyond a predetermined degree to directly connect the shafts and thus provide a factor of safety.

This invention has as a further object the provision of a shaft coupling of the class described wherein the weight is evenly distributed to provide a well balanced device from which all undue vibration is eliminated.

A still further object of this invention resides in the provision of a coupling of the character described capable of being resiliently connected to drive the shafts in either direction and having means for reducing wear between the parts, which means may be readily renewed.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

Figure 1:
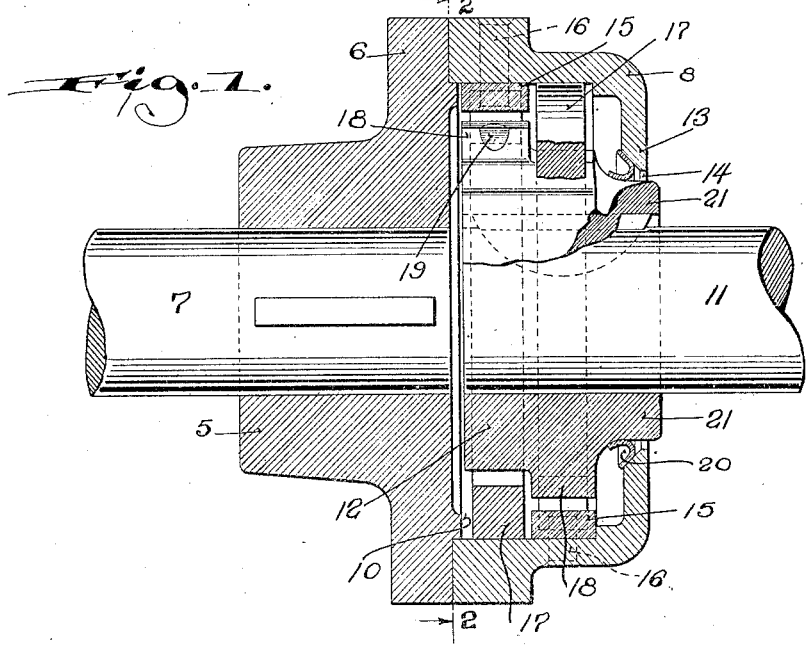
Figure 2:
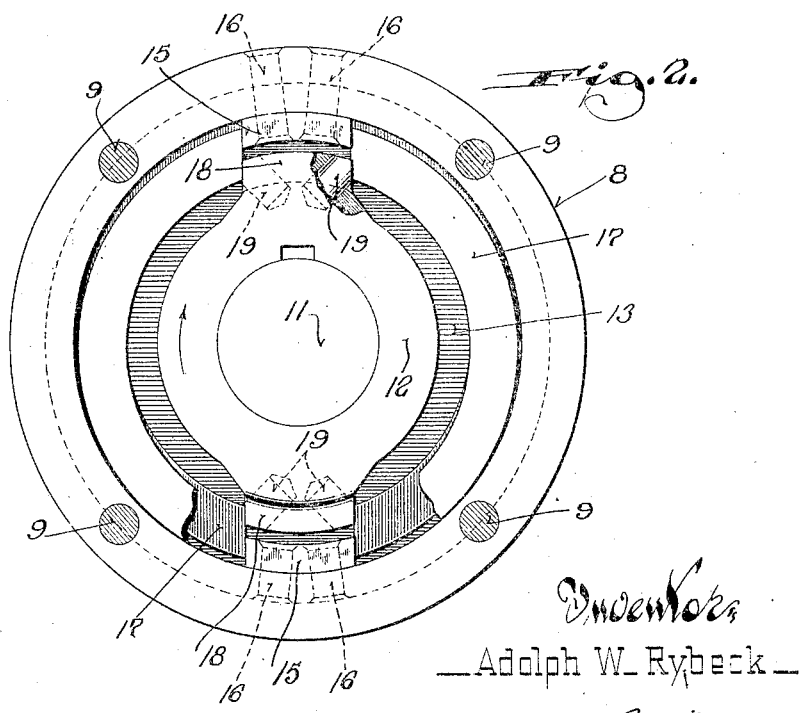

In the accompanying drawing, I have illustrated one complete example of the physical embodiment of my invention constructed according to the best mode I have so far devised for the practical application of the principles thereof, and in which:

Figure 1 is a view illustrating a shaft coupling embodying my invention, said view being partly in side elevation and partly in longitudinal section, and Figure 2 is a view, partly in end elevation and partly in section, and taken through the coupling on the plane of the line 2—2 of Figure 1.

Referring now more particularly to the accompanying drawing in which like numerals designate like parts throughout the several views, the numeral 5 designates the hub of an annular flange plate 6 which is splined or otherwise fixed to a shaft 7 and has a guard housing or casing 8 secured thereto by cap screws or bolts 9. The end face of the plate 6 is preferably provided with an annular rib or bead 10 which has a snug fit in the housing 8 to assure its alignment and provide a rigid connection therewith. The housing 8 extends over and incloses the adjacent end of a shaft 11 which abuts shaft 7 and has a collar 12 splined or otherwise fixed thereon within the casing between flange 6 and the outer end wall 13 through the aperture 14 of which shaft 11 projects.

Diametrically mounted on the inner peripheral wall of the housing 8 are two stops or lugs 15 preferably formed of hardened metal. The lugs 15 are preferably secured to the housing in longitudinal spaced relation by rivets or other fastenings 16 and extend between the ends of a pair of split resilient rings or springs 17 positioned within the housing. The split rings 17 are of greater thickness than the lugs 15 so that they extend inwardly beyond the lugs to provide a recess in which stops or projections 18, formed on the collar 12, are positioned. The projections 18 are also diametrically opposed, but positioned on opposite sides of a line drawn through the axis of the collar to position one in alignment with each lug 15.

The projections 18 are substantially the same width as the lugs 15 and the split rings 17 are positioned in the housing with their ends on opposite sides of the aligned lugs and projections, whereby the lugs and projections are free to move with respect to each other and such movement causes spreading of the split rings. The split rings are under tension at all times and their overall dimensions, when the lugs and projections are in true alignment as shown in Figure 2, is less than that of the inside of the housing.

Any tendency on the part of the shafts to rotate in opposite directions is yieldably resisted by the split rings, each split ring being spread by the torque between the shafts being spread as the lugs and projections move out of alignment, as will be apparent. As the split rings spread, their outside diameters increase and when the stress thereon exceeds a predetermined degree, the split rings 17 fill out engaging the wall of the housing producing a direct non-resilient drive between the shafts and thus affording a factor of safety against the breakage of the split rings.

In order to increase the efficiency and life of the coupling, projections 18 have hardened pins 19 inserted therein to provide a wearing surface with which the split ring ends engage. As will be readily obvious the lugs 15 and the pins 19 may be readily renewed as they become worn.

The entrance of dirt and foreign matter into the interior of the housing 8 is guarded against by a packing or gasket member 20 which extends inwardly from the wall 13 of the housing and engages that portion of the collar member hub 21 adjacent the opening 14. Thus dirt is prevented from entering the coupling and, if it is desired, the same may be filled with a suitable lubricant, such as oil or grease.

What I claim as my invention is:

1. A coupling between two shafts, comprising a housing into which the adjacent ends of the shafts extend, a split resilient ring in the housing, a pair of lugs within the housing and drivingly connected one with each shaft and movable in either direction with respect to each other, and a split resilient ring within the housing with its ends separated by said lugs whereby the disalignment of the lugs in either direction upon the placing of stress on the shafts is yieldably restrained.

2. A coupling between two shafts, comprising a housing fixed to one shaft and extending over the adjacent end of the other shaft, a split resilient ring in the housing, a lug carried by the housing and positioned between the ends of the ring, and a projection carried by the other shaft and positioned between the ends of the resilient ring, said lug and projection being of substantially the same width and normally in radial alignment, and the split ring being of a thickness that the ends thereof overlap the adjacent surfaces of the lug and projections.

3. A coupling between two shafts, comprising a housing fixed to one shaft and extending over the adjacent end of the other shaft, a split resilient ring in the housing, a lug carried by the housing and positioned between the ends of the ring, a projection carried by the other shaft and positioned between the ends of the resilient ring, said lug and projection being of substantially the same width, and said split ring being under tension at all times and tending yieldably to retain the lug and projection in radial alignment.

4. A coupling between two shafts, comprising a housing fixed to one shaft and extending over the adjacent end of the other shaft, a split resilient ring in the housing, a lug carried by the housing and positioned between the ends of said ring, a projection carried by the other shaft in radial alignment with the lug and positioned between the ends of the resilient ring, and means providing wearing surfaces for the projection.

5. A shaft coupling between two shafts, comprising a housing fixed to one shaft, a collar member fixed to the other shaft and disposed within said housing, radially aligned lugs carried by the housing and collar and having their adjacent ends normally in the same plane, and split resilient rings having the aligned lugs positioned between the ends thereof whereby torsional stress between the shafts in either direction is yieldably resisted.

6. A shaft coupling between two shafts, comprising a housing fixed to one shaft, a collar member fixed to the other shaft and disposed within said housing, aligned lugs carried by the housing and collar and normally having their adjacent ends in substantially the same plane, split resilient rings having aligned lugs positioned between the ends thereof whereby torsional stress between the shafts is yieldably resisted, said split rings being normally of less outside diameter than the inside diameter of the housing and being adapted to spread and engage the wall of the housing upon the torsional stress between the shafts exceeding a predetermined degree to directly connect the shafts.

7. A shaft coupling between two shafts, comprising a housing fixed to one shaft, a collar member fixed to the other shaft and disposed within said housing, a stop of metal secured to the inner peripheral wall of the housing, a stop carried by the collar member and extended to a position adjacent the first named stop and adapted to have relative movement therewith, a member providing a wearing surface for the last mentioned stop, and a split, resilient ring positioned within the housing and engaging the opposite sides of said stops to normally tend to radially align the same and resist relative movement therebetween.

In testimony whereof I affix my signature.

ADOLPH W. RYBECK.